May 19, 1964      J. C. NORWOOD      3,133,298
PLASTIC BRUSH FOR WASHING INSIDE OF BOTTLES
Filed Jan. 18, 1963
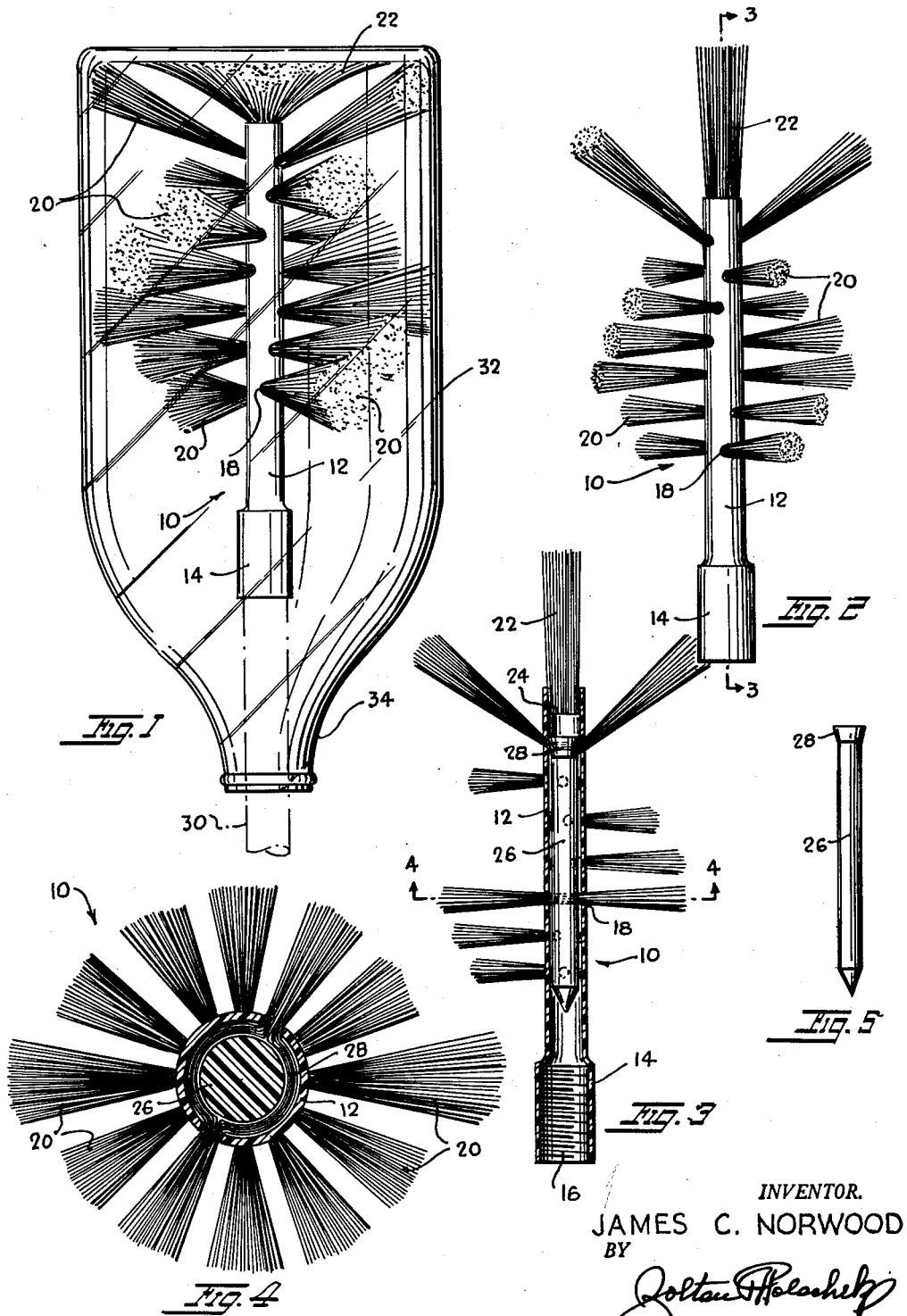
INVENTOR.
JAMES C. NORWOOD
BY
ATTORNEY 3,133,298
PLASTIC BRUSH FOR WASHING INSIDE
OF BOTTLES
James C. Norwood, 6700 3rd Ave., Brooklyn, N.Y.
Filed Jan. 18, 1963, Ser. No. 252,349
1 Claim. (Cl. 15—164)

This invention relates to bottle washers and more particularly to a plastic brush for washing the inside of a bottle or the like.

Considerable difficulty is experienced in washing the insides of bottles, especially household bottles having narrow necks. Furthermore, such bottles often get scarred and scratched in the cleansing operation.

It is the principal object of the present invention to eliminate these difficulties by providing a nylon plastic brush adapted readily to be inserted through the neck of a bottle, jar or the like and provided with means for brushing the inner surface of the bottle or jar.

Another object of the invention is to provide a nylon plastic brush adapted to cleanse the inside of bottles, jars and the like with ready means for attachment to a rotating part of a bottle washing machine.

A further object of the invention is to provide a nylon plastic brush for washing the inside of a bottle that is simple in construction, economical to manufacture and highly efficient for the purposes intended.

The objects hereinbefore set forth as well as others hereinafter appearing are achieved in accordance with the present invention by providing a cylindrical shaped body with perforations and nylon plastic tufts or bristles in the perforations, the plastic tufts radiating in different directions, as well as forming an extension of the body.

Accordingly, a feature of the invention is the employment of an elongated narrow nylon plastic cylindrical body with spaced openings therealong and with nylon plastic tufts or bristles anchored in the openings, one tuft forming an extension of the body.

Another feature of the invention is the employment of a socketed portion at one end of the cylindrical body for ready attachment to a rotating spindle or the like.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

FIG. 1 is a front elevational view of a transparent bottle in inverted condition with a bottle washer embodying the invention applied thereto, the bottle being shown on its way down on the supporting spindle of a washing machine.

FIG. 2 is a side elevational view of the bottle washer per se.

FIG. 3 is a vertical sectional view taken on the line 3—3 of FIG. 2.

FIG. 4 is a cross-sectional view taken on the line 4—4 of FIG. 2, on an enlarged scale.

FIG. 5 is a side elevational view of the clamping rod.

Referring in detail to the drawings, a bottle washer embodying the invention is shown in FIG. 2 and designated generally by the reference numeral 10. The bottle washer is composed of suitable rigid plastic material, preferably nylon, and comprises an elongated tubular body 12 open at both ends. At one end, the body is enlarged forming a socket portion 14 with internal screw threads 16. The tubular body 12 is formed with pairs of opposed holes 18, the holes along one side being arranged in a spiral formation, the holes along the other side also being arranged in spiral formation. Tufts 20 of flexible nylon plastic bristles extend radially and horizontally outwardly from the holes 18. The tufts 20 in the topmost pair of opposed holes extend outwardly longer than the tufts in the other holes. The tufts 20 also are bent slightly upwardly. A tuft 22 of nylon bristles also extends out through the open top of the body 12 forming an extension of the body.

In assembling the tufts in the body 12, the bristles forming the pairs of tufts 20 are inserted through the opposed holes 18 of the body across the body so that the bristles extend radially and laterally outwardly of each side of the body. A solid elongated cylindrical plastic rod 26 is inserted downwardly through the open top of the body and through the loose bristles of the studs whereby said bristles are moved sidewise and clamped between the rod and the inner surface of the body as indicated at 28 in FIG. 4. The tufts 20 are thus anchored in place.

The rod has a flaring head 28 that engages the bristles of the uppermost pair of studs 20 pulling the bristles downwardly inside the body and bending the bristles of the tufts outwardly of the body so that normally the tufts are in an upwardly slanting direction as seen in FIG. 3. The top tuft 22 is then inserted through the open top of the body and the inserted end fastened therein by adhesive such as plastic cement 24.

In use, the bottle washer 10 is mounted on an upstanding rotating part of a washing machine, such as an upright spindle 30 shown in dotted lines in FIG. 1. This is accomplished by screwing the socket portion 14 onto the top threaded end of the spindle. When it is thus mounted on the washing machine and spinning around, a bottle to be washed such as the bottle 32 shown in FIG. 1 is inserted by the operator over the washer 10. The spinning of the washer 10 causes the bristles of the tuft 22 to spread out by centrifugal force but not sufficiently to prevent movement of the neck 34 of the bottle over the bristles. During passage of the neck 34 over the tufts 20, such tufts will flex downwardly and inwardly toward the body 12 of the washer, and when the neck 34 passes the tufts, such tufts 20 will spring back to horizontal radial condition with their ends pressing against the inside surface of the bottle as shown in FIG. 1.

The bottle is manually forced downwardly over the washer until the ends of the tufts 20 in the topmost pair of holes 18 engage in the corner of the bottom of the bottle and the tuft 22 spreads out meshing with the said topmost tufts 20. The corner of the bottle, which is the most difficult part of the bottle to clean, is accordingly covered by bristles and thoroughly cleaned, and any adherent encrusted insoluble matter, particularly rust stains, is removed. The nylon bristles prevent damage to the bottle by scarring, scratching and the like.

The cleansing operation may be carried on with the bottle partly filled with liquid or carrying any desired cleanser such as soap to further remove any organic matter or to rinse the bottle internally. As a result of such operation, the bottles are rendered perfectly santitary for further use.

While I have illustrated and described the preferred embodiment of my invention, it is to be understood that I do not limit myself to the precise construction herein disclosed and that various changes and modifications may be made within the scope of the invention as defined in the appended claim.

Having thus described my invention, what I claim as new, and desire to secure by United States Letters Patent is:

A bottle washer comprising an elongated tubular nylon plastic body open at both ends with spaced pairs of opposed holes therealong, the holes being arranged in spiral formation, continuous tufts of nylon bristles protruding radially and outwardly in spread-out fashion through and extending oppositely out of each pair of holes, the tufts in the topmost pair of opposed holes being inclined upwardly and being longer than the tufts in the other pairs of opposed holes, a tuft of nylon bristles extending outwardly of the opening in one end of the body, said latter tuft forming an extension of the body, the bristles of said last-named tuft being fastened interiorly of and below the wall of said opening in said one end by an adhesive, and an elongated cylindrical pointed rod extending through the tubular body for moving the radial bristles sidewise and clamping the radial bristles between the rod and the inner surface of the body, said rod having a downwardly converging tapered head positioned below the opening of the tubular body and wholly within said body, said head effecting the inclining of the bristles in the topmost pair of opposed holes.

References Cited in the file of this patent

UNITED STATES PATENTS

| | | |
|---|---|---|
| 934,058 | Farrar | Sept. 14, 1909 |
| 1,304,543 | Concannon et al. | May 27, 1919 |
| 2,334,690 | Yden | Nov. 23, 1943 |
| 2,626,413 | Girton | Jan. 27, 1953 |
| 2,909,799 | Lundeen | Oct. 27, 1959 |
| 3,085,272 | Weichselbaum | Apr. 16, 1963 |

FOREIGN PATENTS

| | | |
|---|---|---|
| 13,669 | Denmark | Aug. 30, 1910 |
| 167,797 | Germany | Feb. 9, 1906 |
| 237,965 | Great Britain | Aug. 4, 1925 |
| 1,062,210 | Germany | July 30, 1959 |